(12) United States Patent
Aoki et al.

(10) Patent No.: US 8,390,640 B2
(45) Date of Patent: Mar. 5, 2013

(54) TELEVISION DEVICE FOR ADJUSTING QUALITY OF VIDEO IMAGE TO BE DISPLAYED

(75) Inventors: Hiroshi Aoki, Yokohama (JP); Akira Kitazume, Fujisawa (JP); Daisuke Honda, Yokohama (JP); Naoya Oka, Yokohama (JP); Yuki Nagano, Yokohama (JP); Hiroyuki Kurabayashi, Yokohama (JP); Akihiro Shiraishi, Kawasaki (JP); Toshiaki Ohyama, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 642 days.

(21) Appl. No.: 12/615,394

(22) Filed: Nov. 10, 2009

(65) Prior Publication Data

US 2010/0220109 A1    Sep. 2, 2010

(30) Foreign Application Priority Data

Nov. 19, 2008  (JP) ................. 2008-295534

(51) Int. Cl.
| | |
|---|---|
| G09G 3/30 | (2006.01) |
| G09G 5/00 | (2006.01) |
| G09G 5/10 | (2006.01) |
| H04N 5/44 | (2011.01) |
| H04N 5/445 | (2011.01) |
| H04N 5/57 | (2006.01) |
| H04N 5/14 | (2006.01) |
| H04N 1/46 | (2006.01) |
| H04N 1/40 | (2006.01) |
| G06K 9/40 | (2006.01) |
| G06K 9/20 | (2006.01) |

(52) U.S. Cl. ........ 345/589; 345/581; 345/207; 345/690; 345/77; 348/553; 348/563; 348/602; 348/673; 348/687; 358/509; 358/448; 358/516; 382/254; 382/274; 382/312

(58) Field of Classification Search ............ 345/428, 345/581, 589, 617–618, 204, 211, 207, 690, 345/63, 77; 348/553, 563, 602–603, 673, 348/687, 731–734, 739, 751, 790–791; 358/504, 358/509, 516, 448; 382/254, 274, 312
See application file for complete search history.

(56) References Cited

U.S. PATENT DOCUMENTS
(Continued)

FOREIGN PATENT DOCUMENTS
| | | |
|---|---|---|
| CN | 101097706 | 1/2008 |
| JP | 04-342373 | 11/1992 |

(Continued)

*Primary Examiner* — Wesner Sajous
(74) *Attorney, Agent, or Firm* — Antonelli, Terry, Stout & Kraus, LLP.

(57) ABSTRACT

A television device structured to automatically adjust the color temperature on the display screen in accordance with the viewing environment includes an external light detection unit or an optical sensor for detecting the illuminance and the tint of the ambient light, and an image quality control unit or a microcomputer for adjusting quality of the video image to be displayed on the display panel. The image quality control unit adjusts the color temperature of the video image to be displayed in accordance with the illuminance value and the tint value detected by the external light detection unit. The optical sensor includes an illuminance sensor for mainly detecting the visible light, and an infrared sensor for mainly detecting the infrared light. The illuminance value and the tint value are obtained based on the output values of those two sensors.

9 Claims, 4 Drawing Sheets

U.S. PATENT DOCUMENTS

| | | |
|---|---|---|
| 7,562,242 B2 | 7/2009 | Hori |
| 2004/0027672 A1* | 2/2004 | Bourdelais et al. ........... 359/586 |
| 2005/0264482 A1 | 12/2005 | Suzuki et al. |
| 2007/0133017 A1* | 6/2007 | Kobayashi ..................... 358/1.9 |
| 2007/0296867 A1 | 12/2007 | Park |
| 2008/0055228 A1* | 3/2008 | Glen ............................... 345/102 |
| 2008/0107360 A1* | 5/2008 | Yamashita et al. ............ 382/313 |
| 2008/0266389 A1* | 10/2008 | DeWind et al. ................ 348/115 |
| 2009/0295938 A1* | 12/2009 | Nikkanen ................... 348/223.1 |
| 2010/0020052 A1* | 1/2010 | Kim ................................ 345/207 |
| 2011/0169721 A1* | 7/2011 | Bauer et al. ..................... 345/84 |

FOREIGN PATENT DOCUMENTS

| | | |
|---|---|---|
| JP | 05-292536 | 11/1993 |
| JP | 06-261334 | 9/1994 |
| JP | 11-316566 | 11/1999 |
| JP | 2000-112021 | 4/2000 |
| JP | 2004-045466 | 2/2004 |
| JP | 2005-321508 | 11/2005 |
| JP | 2006-254185 | 9/2006 |
| JP | 2008-242354 | 10/2008 |

* cited by examiner

FIG. 4A

| | | | EXTERNAL LIGHT ILLUMINANCE (ILL) | | | | | | | | | |
|---|---|---|---|---|---|---|---|---|---|---|---|---|
| Tc (K) | REGION | (Lx) | 0 | 1 | 50 | 2 | 3 | 100 | 4 | 5 | 200 | 300 | 400 |
| | | REGION | 0 | 1 | 2 | 3 | 4 | 5 | 6 | 7 | 8 | 9 |
| | | EXAMPLE OF INSTALLATION LOCATION / EXAMPLE OF ILLUMINATION | | | HOME | | | | | | | SHOP |
| | | | (LIVING ROOM THEATER) | | (DARK LIVING ROOM) | | (WELL-LIGHTED LIVING ROOM) | | | | | |
| 3000 | 0 | BULB (2800K) | COLOR TEMPERATURE: LOW Tc=6500K | | | | COLOR TEMPERATURE: MEDIUM, LOW Tc=7200K | | | | | |
| | 1 | | | | | | | | | | | |
| | 2 | BULB COLOR L (3000K) | | | | | | | | | | |
| | 3 | WARM WHITE COLOR WW (3500K) | | | | | COLOR TEMPERATURE: MEDIUM Tc=9300K | | | | | |
| 4000 | 4 | | | | | | | | | | | |
| | 5 | WHITE COLOR W (4200K) | | | | | | | COLOR TEMPERATURE: HIGH, MEDIUM Tc=12000K | | | |
| | 6 | DAYTIME WHITE COLOR N (5000K) | | | | | | | | | | |
| 5000 | 7 | | | | | | | | | | | |
| 6000 | 8 | DAYLIGHT COLOR D (6700K) | | | | | | | | | COLOR TEMPERATURE: HIGH Tc=14000K | |
| 7000 | 9 | | | | | | | | | | | |

EXTERNAL LIGHT TINT (TINT)

FIG. 4B

| | | EXTERNAL LIGHT ILLUMINANCE (ILL) | | | | | | | | | |
|---|---|---|---|---|---|---|---|---|---|---|---|
| | REGION | 0 | 1 | 2 | 3 | 4 | 5 | 6 | 7 | 8 | 9 |
| OTHER IMAGE QUALITY | CONTRAST (PDP ONLY) | −13 | −9 | −5 | −2 | 0 (STANDARD) | +9 | +18 | +27 | +29 | +31 |
| | BACKLIGHT (LCD ONLY) | 0 | +1 | +2 | +3 | +3 (STANDARD) | +6 | +11 | +15 | +18 | +20 |
| | BRIGHTNESS | +4 | +3 | +2 | +1 | 0 (STANDARD) | 0 | 0 | 0 | 0 | 0 |
| | COLOR DENSITY | −6 | −4 | −2 | 0 | +1 (STANDARD) | +1 | +1 | +1 | +5 | +10 |

TELEVISION DEVICE FOR ADJUSTING QUALITY OF VIDEO IMAGE TO BE DISPLAYED

CLAIM OF PRIORITY

The present application claims priority from Japanese patent application serial No. JP 2008-295534, filed on Nov. 19, 2008, the content of which is hereby incorporated by reference into this application.

BACKGROUND OF THE INVENTION (1) Field of the Invention

The present invention relates to a television device for providing images with appropriate quality in accordance with a viewing environment.

(2) Description of the Related Art

Various functions of the video display device such as a television device have been proposed for adjusting the video image quality in accordance with the viewing environment such as ambient brightness. For example, Japanese Published Unexamined Patent Application No. 4-342373 discloses the television receiver structured to automatically adjust the image quality to the level adapted to the viewing environment based on the illuminance data of the ambient brightness and the distance data with respect to the viewing distance between the receiver and the viewer. Japanese Published Unexamined Patent Application No. 2000-112021 discloses a display device of projection type structured to allow the light detection unit to detect the light flux from the display area, and automatically adjust the light flux projected to the display area based on the output signal from the light detection unit.

SUMMARY OF THE INVENTION

The technology disclosed in Japanese Published Unexamined Patent Application No. 4-342373 is capable of adjusting the image quality level (fineness of the image) in accordance with the viewing environment (brightness and viewing distance). The technology disclosed in Japanese Published Unexamined Patent Application No. 2000-112021 is capable of adjusting the projected light intensity based on the brightness on the projected screen and the human body detection signal. The above-described technology may be effective for the brightness and contrast on the display screen, but requires adjustment of the color temperature to further improve the image quality. However, there is no disclosure about adjustment of the color temperature on the display screen in accordance with the tint of the illumination light, especially, specific description how to detect the tint of the illumination light, and how to correlate the tint with the color temperature on the screen under the control.

The present invention provides a television device capable of automatically adjusting the color temperature on the display screen in accordance with the viewing environment.

The television device for adjusting quality of the received image so as to be displayed on the screen according to the present invention includes an external light detection unit which detects an illuminance and a tint of an ambient light; and an image quality control unit which adjusts the quality of the video image to be displayed on the display unit. The image quality control unit adjusts a color temperature of the video image to be displayed in accordance with an illuminance value and a tint value detected by the external light detection unit.

The external light detection unit obtains the illuminance value and the tint value from the output value of the illuminance sensor for detecting visible lights and the output value of the infrared sensor for detecting infrared lights.

The present invention provides the image with more natural tint by automatically adjusting the color temperature on the display screen in accordance with the viewing environment.

BRIEF DESCRIPTION OF THE DRAWINGS

These and other features, objects and advantages of the present invention will become more apparent from the following description when taken in conjunction with the accompanying drawings wherein:

FIGS. 4A and 4B illustrate a specific example of the image quality control according to the embodiment;

DESCRIPTION OF THE PREFERRED EMBODIMENTS

Figure 1A:
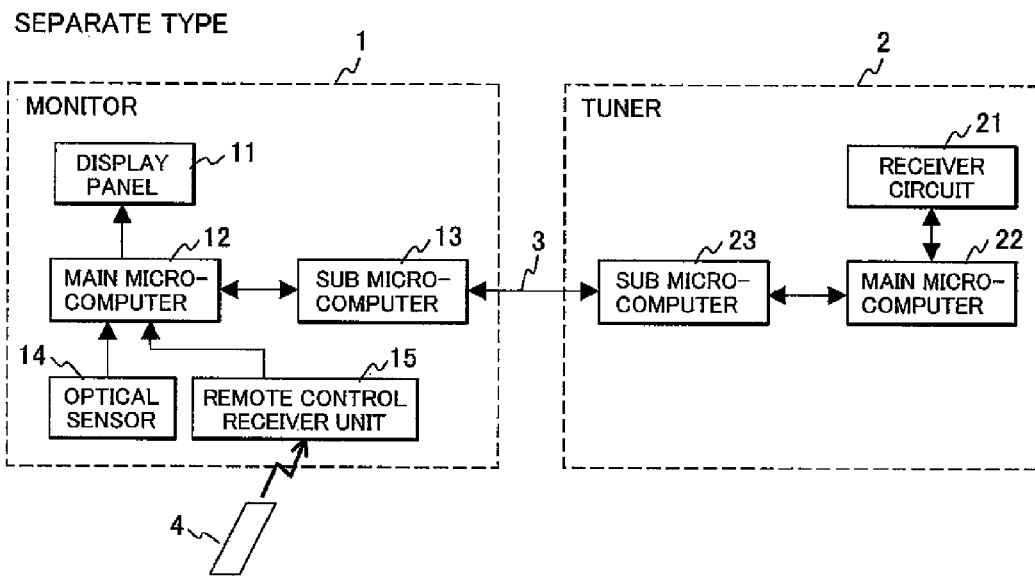
FIGS. 1A and 1B illustrate an embodiment of a television device according to the present invention.

An embodiment of the present invention will be described referring to the drawings.

Figure 1B:
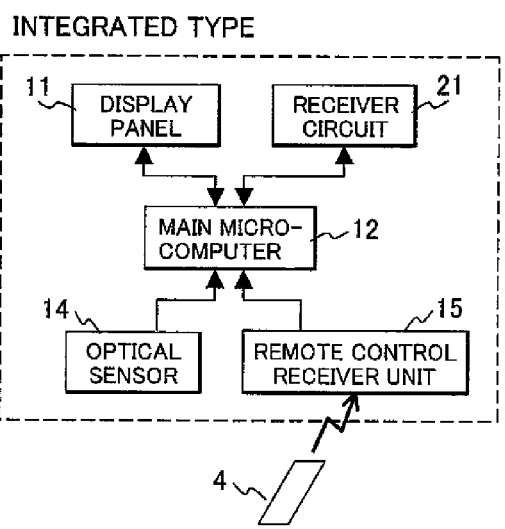

Each of FIGS. 1A and 1B illustrates an embodiment of a television device according to the present invention. FIG. 1A is a view of a structure having a monitor 1 for displaying the video image and a tuner 2 for receiving broadcast signals separated. FIG. 1B is a view of a structure having the monitor 1 and the tuner 2 integrated.

Referring to FIG. 1A, the monitor 1 includes a display panel 11, a main microcomputer 12, a sub microcomputer 13, an optical sensor 14, and a remote control receiver unit 15. A plasma display panel (PDP) for applying sustain pulses to discharge cells for the respective RGB colors for discharging to form the video image, and a liquid crystal display panel (LCD) for modulating the light from the backlight with the video signal to form the video image may be employed as the display panel 11. The optical sensor 14 is a composite sensor having an illuminance sensor and an infrared sensor combined as described later, and structured to be attached to the periphery of the monitor 1 (bezel portion) to detect the illuminance and the tint around the device. It is preferable to attach the optical sensor 14 to the lower portion around the monitor 1 (especially adjacent to the corner portion) for allowing easy detection of the external light such as illumination in the room. However, it may be attached to the upper portion. The remote control receiver unit 15 receives an operation command from the user via a remote control 4. The main microcomputer 12 inputs the signal from the optical sensor 14 and the remote control receiver unit 15 to control quality of the video image to be displayed on the display panel 11. The sub microcomputer 13 transmits/receives the signal to/from the tuner 2.

The tuner 2 includes a receiver circuit 21, a main microcomputer 22 and a sub microcomputer 23. The receiver circuit 21 selects a desired channel to demodulate the received signal. The main microcomputer 22 controls the receiver circuit 21 to control the device as a whole including the operation of the monitor 1. The sub microcomputer 23 transmits/receives the signal to/from the monitor 1. A cable 3 transmits the video signal and the control signal between the monitor 1 and the tuner 2.

In the embodiment, the color temperature, brightness, contrast, color density, and sharpness of the video image displayed on the display panel 11 are adjusted based on the detection signal from the optical sensor 14. The detection signal from the optical sensor 14 is transmitted to the main microcomputer 22 of the tuner 2 via the main microcomputer 12 and the cable 3 for determining the optimum image quality condition. The optimum condition is transmitted to the main microcomputer 12 of the monitor 1 again, and sends the control signal to the display panel 11. The microcomputer 12 of the monitor 1 may be structured to determine the optimum image quality condition in accordance with the detection signal from the optical sensor 14.

FIG. 1B illustrates the structure having the monitor 1 and the tuner 2 integrated, and a single unit of the main microcomputer 12 shared therebetween while eliminating the sub microcomputers 13, 23 and the cable 3. In this case, the main microcomputer 12 determines the optimum image quality condition to control the display panel 11. The other operations are the same as those of the device of separate type as illustrated in FIG. 1A, and explanations thereof, thus will be omitted.

Figure 2:
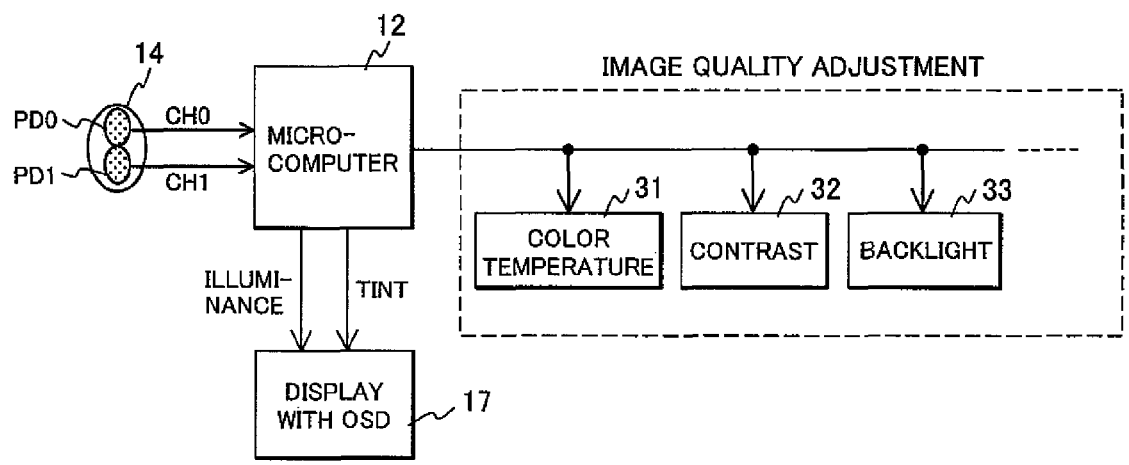
FIG. 2 is an explanatory view representing an image quality control based on a detection signal from an optical sensor.

FIG. 2 is an explanatory view representing the image quality control using the detection signal from the optical sensor. The explanation will be made with respect to the device of integrated type as illustrated in FIG. 1B.

The optical sensor 14 includes an illuminance sensor PD0 as a first sensor for detecting an illuminance (brightness) of the external light, and an infrared sensor PD1 as a second sensor for detecting a tint of the external light. Each of those sensors is formed of a photo diode. The illuminance sensor PD0 mainly detects the visible light, and the infrared sensor PD1 mainly detects the infrared light to output the respective detection intensity signals CH0 and CH1 to the microcomputer 12.

The microcomputer 12 calculates the illuminance and the tint of the external light based on the detection signals CH0 and CH1, respectively. It is assumed that the disclosed external light illuminance and the tint are designated as "illuminance value (ILL)" and "tint value (TINT)", respectively. In accordance with the calculated illuminance value and the tint value, the image quality control with respect to a color temperature 31, a contrast 32 (PDP), a backlight 32 (LCD), a color density, and a sharpness is executed. Especially, the condition for adjusting the color temperature 31 is set in accordance with the combination of the illuminance value and the tint value. Specifically, the RGB balance (ratio) is controlled by allowing an RGB gain processor to adjust the gain of the three-primary-color signal for setting a low color temperature (setting to make the gain of R signal relatively large, warm color) and a high color temperature (setting to make the gain of B signal relatively large, cold color).

The microcomputer 12 displays the calculated illuminance value and the tint value, and the power saving state obtained through the image quality adjustment on an OSD (On Screen Display) 17 in the display panel 11.

Figure 3:
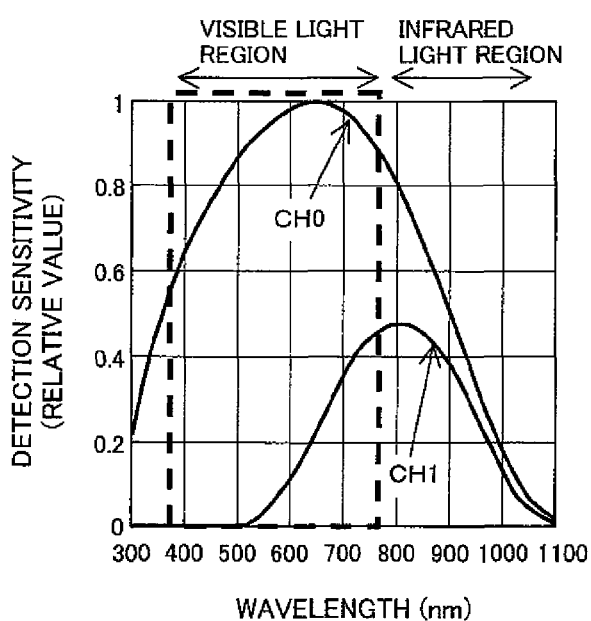
FIG. 3 is a view illustrating an example of the optical sensitivity characteristic of the optical sensor.

FIG. 3 illustrates an example of the optical sensitivity characteristic of the optical sensor. The X-axis represents the optical wavelength, and Y-axis represents the detection sensitivity. The code CH0 represents a sensitivity characteristic of the illuminance sensor PD0 mainly for detecting the visible light. Referring to the characteristic illustrated in FIG. 3, the illuminance sensor PD0 detects the light partially including the infrared light region, and has a characteristic peak in the visible light region. It is therefore used for detecting the external light illuminance. The code CH1 represents a sensitivity characteristic of the infrared sensor PD1 mainly for detecting the infrared light. Referring to the characteristic illustrated in FIG. 3, the infrared sensor PD1 detects the light partially including the visible light region, and has a characteristic peak in the infrared region. It is therefore used for detecting the external light tint value.

As described above, the illuminance sensor PD0 detects the infrared light, and the infrared sensor PD1 detects the visible light. Correction of the detected results output from those sensors is required for obtaining accurate values of illuminance and tint. The correction for calculating the illuminance value (ILL) and the tint value (TINT) from the detection signals CH0 and CH1 will be performed as described below.

The illuminance value (ILL) is obtained by subtracting the signal CH1 (infrared light) from the signal CH0 (visible light+infrared light), and calculating a visible light component through a formula (1). The illuminance value (ILL) is derived as a value of 1×:

$$\text{illuminance value (ILL)} = \alpha 1 \times CH0 - \alpha 2 \times CH1 \quad (1)$$

where coefficients α1 and α2 are variable in accordance with the ratio between CH0 and CH1 for correcting dependency of the sensor detection sensitivity on the wavelength. In this way, the illuminance value (ILL) is increased as the signal CH0 output from the illuminance sensor PD0 becomes large.

The tint value (TINT) is obtained by calculating the tint degree (reddish or bluish) through a formula (2) based on the ratio between the signal CH0 (visible light+infrared light) and the signal CH1 (infrared light). The tint value (TINT) is the value corresponding to the color temperature. Therefore, the color becomes bluish as the value becomes large, and reddish as the value becomes small.

$$\text{tint value (TINT)} = CH0/CH1 \times \beta 1 + \beta 2 \quad (2)$$

The coefficients β1 and β2 are variable in accordance with the ratio between the CH0 and CH1 for correcting dependency of the sensor detection sensitivity on the wavelength. In this way, the tint value (TINT) is decreased as the signal CH1 output from the infrared sensor PD1 is made larger.

Mostly the expensive color sensor (for example, RGB sensor) has been generally used for detecting the tint value. The embodiment may be formed of two relatively inexpensive sensors (photo diodes) for respectively detecting the visible light and the infrared light, thus reducing the sensor cost.

In order to avoid instantaneous fluctuation of the ambient light, detection of the optical sensor is conducted by taking data (CH0, CH1) at a predetermined time interval (for example, at the interval of 100 ms), and calculating the illuminance value (ILL) and the tint value (TINT) using the above-described formulae (1) and (2) to obtain an average value of data detected by predetermined times (5 times, for example).

Each of the thus obtained illuminance value and the tint value has the intensity classified into plural stages (referred to as the region). In the embodiment, the value is segmented into 10 regions in accordance with the visual characteristic. The optimum condition of the image quality parameter is set for the respective regions. Segmentation of the illuminance value and the tint value into plural regions may reduce the data size of the control signal, which is advantageous for transmitting the control signal using the cable 3 in the structure having the monitor 1 and the tuner 2 separated as shown in FIG. 1A.

The image quality setting will be switched in response to the change in the ambient light. However, the image quality which is largely changed while viewing may make the user uncomfortable. It is preferable to reduce the rate of change upon adjustment of the image quality by increasing the number of classified regions. If the detection value is adjacent to the boundary between two regions, the image quality setting is frequently switched between those two regions to cause the flicker on screen. Accordingly, it is preferable to conduct the hysteresis control by forming an insensitive region in the rate of the change of the detection value. The aforementioned signal processing suppresses fluctuation in the displayed image caused by the very small change in the ambient light, thus providing the stable image.

FIGS. 4A and 4B illustrate examples of the image quality control according to the embodiment. FIG. 4A represents adjustment of a color temperature Tc on the screen, and FIG. 4B represents adjustment of the other image quality.

Under the control of the color temperature Tc as illustrated in FIG. 4A, the optimum color temperature is set in accordance with the combination of the external light illuminance value (ILL) and the external light tint value (TINT). For example, in case of the illumination where the indoor environment at home is dark (low illuminance value) and the illumination is rather reddish like the incandescent lamp and the fluorescent bulb (low tint value), the color temperature Tc on the screen is lowered to the low level (6500 K or 7200 K) as the normal color temperature on the display so as to reproduce the hue faithfully (upper left region in the drawing). In case of the illumination where the illuminance value is low and bluish like the fluorescent lamp in daylight color (high tint value), the color temperature Tc is increased to the medium level (9300 K) (lower left region in the drawing). In the daytime, as the illuminance value becomes large owing to sunlight, the color temperature Tc is increased to the medium level (9300 K) to make the color hue natural in spite of the low tint value (center region in the drawing). Meanwhile, in the shop environment, the illuminance is likely to be maximized. In case of high illuminance value, low color temperature Tc causes the video image to be relatively dark, thus deteriorating the image quality. Then the color temperature Tc is increased to the high level (14000 K) without considering the tint value for the bright video image against the bright illumination.

FIG. 4B illustrates the other image quality control for adjusting the contrast (only PDP), the illuminance of the light from the backlight (only LCD), the brightness, and the color density. They are adjusted in accordance with the aforementioned external light illuminance value (ILL). In case of high incidence of the external light, the contrast, the backlight, and the color density are intensified for the purpose of preventing lowering of the contrast and the color saturation caused by black floating. In case of the PDP, the number of the sustain pulses may be controlled. For example, when the external light illuminance value (ILL) is high, the number of the sustain pulses is increased. When the external light illuminance value is low, the number of the sustain pulses is decreased. In addition to the aforementioned control, the sharpness may also be adjusted. For example, when the external light illuminance (ILL) is high, incidence of the external light is substantially high to deteriorate the sharpness. In this case, the adjustment may be performed to intensify the sharpness. When the external light illuminance (ILL) is low, incidence of the external light is substantially low to have noise on the screen comparatively noticeable. In this case, the adjustment may be performed to weaken the sharpness.

In the aforementioned embodiment, the contrast, the backlight, the brightness, the color density and the sharpness are controlled only in accordance with the external light illuminance value (ILL). However, they may be controlled in accordance with combination of the external light illuminance value (ILL) and the external light tint value (TINT). For example, if both the external light illuminance value (ILL) and the external light tint value (TINT) are low, the control for lowering the contrast and the backlight may be executed.

In the embodiment, the color temperature and the contrast on the display screen may be automatically adjusted in accordance with the viewing environment, which is effective for providing more natural video image with higher quality. The aforementioned adjustment values are introduced for illustrative purposes, and therefore, it is to be understood that they may be appropriately changed in accordance with the installation state and the user's taste.

A modified example for operating the television device according to the embodiment more preferably will be described hereinafter.

Figure 5:
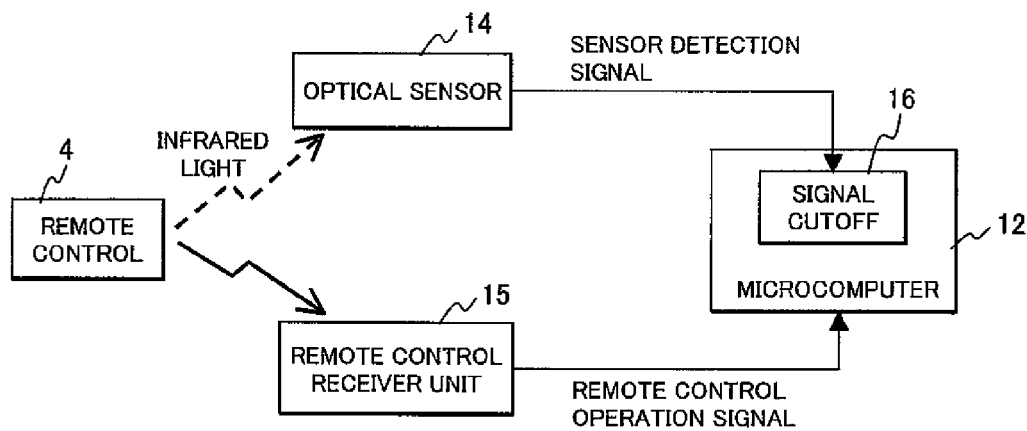
FIG. 5 is a view representing a method for preventing malfunction of the image quality control while operating a remote control.

FIG. 5 is a view illustrating a method for preventing malfunction of the image quality control upon operation of a remote control. The optical sensor 14 for detecting the external light as the viewing environment is likely to detect the light which contains the infrared light generated by the remote control 4. When the remote control is operated, the detection signal from the optical sensor 14 tends to deviate from the correct tint information of the external light. This may prevent the microcomputer 12 from executing the appropriate image quality control. For this, the microcomputer 12 is provided with a signal cutoff function 16 for temporarily cutting off the detection signal from the optical sensor 14. Upon reception of the operation signal from the remote control receiver unit 15, the microcomputer 12 blocks the sensor detection signal to interrupt the image quality control for a predetermined period. This makes it possible to eliminate the malfunction upon the remote control operation while allowing the smooth control.

Figure 6:
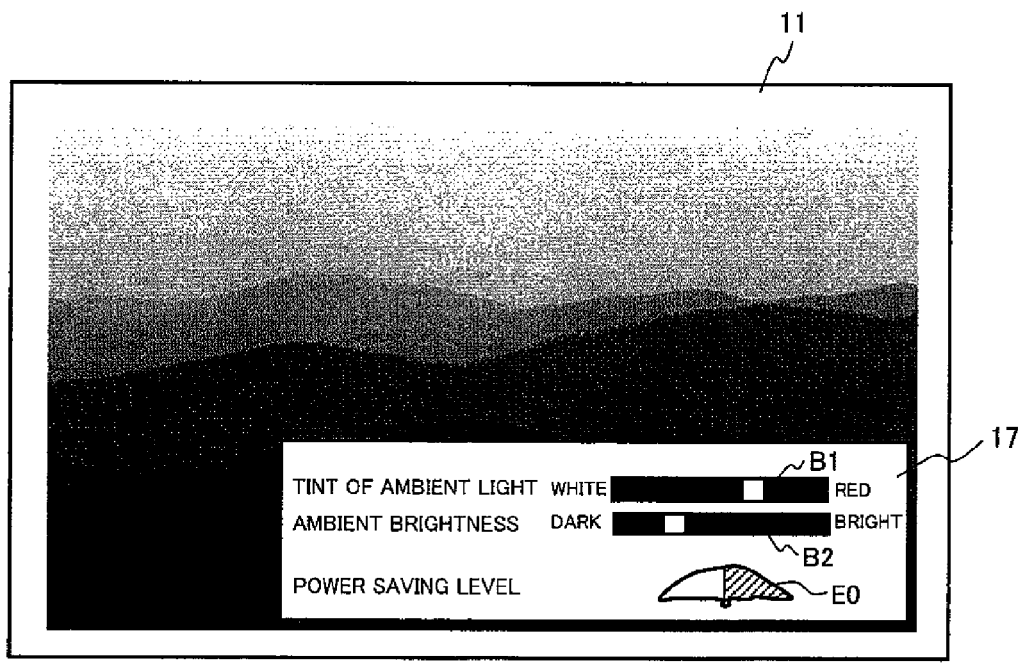
FIG. 6 is a view illustrating an example of the viewing environment state displayed on the screen.

FIG. 6 is a view illustrating an example of the viewing environment state displayed on the screen for notifying the user of the state of the external light detected by the optical sensor 14 by means of the OSD 17 in the display panel 11. As the display content, the tint and the brightness of the ambient light may be notified. Those properties may be displayed on the bar with 10 levels based on the tint value (TINT) and the illuminance value (ILL) used for the image quality control, for example.

Referring to FIG. 6, a bar B1 which denotes the "tint of ambient light" is formed based on the tint value (TINT). The pointer contained in the bar B1 laterally slides by the amount corresponding to the tint value (TINT). As the tint value (TINT) becomes small, the ambient light (external light) becomes reddish. Accordingly, the pointer slides to the direction of "red" as displayed at the right side of the bar B1. As the tint value (TINT) becomes large, the ambient light (external light) becomes more whitish. Accordingly, the pointer slides to the direction of "white" as displayed at the left side of the bar B1. A bar B2 which denotes the "brightness of ambient light" is formed based on the illuminance value (ILL). The pointer of the bar B2 laterally slides by the amount corresponding to the illuminance value (ILL). As the illuminance value (ILL) becomes large, the ambient light (external light) becomes brighter. Accordingly the pointer slides to the direction of "bright" displayed at the right side of the bar B2. As the illuminance value (ILL) becomes small, the ambient light (external light) becomes dark. Accordingly the pointer slides to the direction of "dark" displayed at the left side of the bar B2.

The power saving state resulting from the image quality adjustment is displayed using an eco meter E0. The power saving level displayed by the eco meter E0 represents how much the power consumption may be saved by the level adjustment of the contrast (PDP) or the backlight (LCD) indicated by an icon of a green tree. In the case where the liquid crystal panel is employed as the display panel of the display device, the low detection value of the illuminance sensor PD0 represents the dark external light, and accordingly, the control for lowering the optical output of the backlight is executed. The power consumption of the display device is lowered. In this case, the eco meter B0 is displayed to increase the green shaded area. Meanwhile, the high detection value of the illuminance sensor PD0 represents the bright ambient light, and accordingly, the control for increasing the optical output of the backlight is executed to increase the power consumption of the display device. In this case, the eco meter E0 is displayed to make the white area large.

The aforementioned display allows the user to have the information with respect to the current indoor environment and the power saving state, and further the relationship between the indoor environment (especially brightness of the interior illumination) and the power consumption. The user may be encouraged to take an action for saving power with respect to the device and the ambient environment (interior illumination), for example, to dim the light or turn off the light in the room upon confirmation of large white area of the eco meter E0 indicating high power consumption.

The television device has been described in the embodiments, and it is to be understood that the present invention is applicable to the video display device (monitor device) as well.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A television device for adjusting quality of a received video image to be displayed on a display unit, comprising:
   an external light detection unit which detects an illuminance and a tint of an ambient light; and
   an image quality control unit which adjusts the quality of the video image to be displayed on the display unit;
   wherein the image quality control unit adjusts a color temperature of the video image to be displayed in accordance with an illuminance value and a tint value detected by the external light detection unit; and
   wherein the image quality control unit adjusts the color temperature to become high as both the illuminance value and the tint value become large.

2. A television device for adjusting quality of a received video image to be displayed on a display unit, comprising:
   an external light detection unit which detects an illuminance and a tint of an ambient light; and
   an image quality control unit which adjusts the quality of the video image to be displayed on the display unit;
   wherein the image quality control unit adjusts a color temperature of the video image to be displayed in accordance with an illuminance value and a tint value detected by the external light detection unit, and adjusts a contrast of the video image to be displayed in accordance with at least the illuminance value detected by the external light detection unit; and
   wherein the image quality control unit adjusts the contrast to become high as the illuminance value becomes large.

3. The television device according to claim 2, wherein the image quality control unit further adjusts a color density of the video image to be displayed in accordance with at least the illuminance value detected by the external light detection unit.

4. The television device according to claim 2, wherein the image quality control unit further adjusts a sharpness of the image to be displayed in accordance with at least the illuminance value detected by the external light detection unit.

5. A television device for adjusting quality of a received video image to be displayed on a display unit, comprising:
   an external light detection unit which detects an illuminance and a tint of an ambient light; and
   an image quality control unit which adjusts the quality of the video image to be displayed on the display unit;
   wherein the display unit includes a liquid crystal panel provided with a backlight;
   wherein the image quality control unit adjusts a color temperature of the video image to be displayed in accordance with an illuminance value and a tint value detected by the external light detection unit, and adjusts an illuminance of a light from the backlight in accordance with at least the illuminance value detected by the external light detection unit; and
   wherein the video image quality control unit adjusts the illuminance of the light from the backlight to become high as the illuminance value becomes large.

6. The television device for adjusting quality of a received video image to be displayed on a display unit, comprising:
   an external light detection unit which detects an illuminance and a tint of an ambient light; and
   an image quality control unit which adjusts the quality of the video image to be displayed on the display unit;
   wherein the image quality control unit adjusts a color temperature of the video image to be displayed in accordance with an illuminance value and a tint value detected by the external light detection unit; and
   wherein the external light detection unit obtains the illuminance value and the tint value from an output value of a first sensor for detecting an illuminance of the external light and an output value of a second sensor for detecting a tint of the external light.

7. The television device according to claim 6, wherein the first sensor is an illuminance sensor for detecting a visible light, and the second sensor is an infrared sensor for detecting an infrared light.

8. A television device for adjusting quality of a received video image to be displayed on a display unit, comprising:
   an external light detection unit which detects an illuminance and a tint of an ambient light; and
   an image quality control unit which adjusts the quality of the video image to be displayed on the display unit;
   wherein the image quality control unit adjusts a color temperature of the video image to be displayed in accordance with an illuminance value and a tint value detected by the external light detection unit; and
   further comprising:
   a remote control receiver for receiving an operation signal from a remote control;

wherein the image quality control unit interrupts a video image quality adjustment when the remote control receiver receives the operation signal from the remote control.

9. A television device for adjusting quality of a received video image to be displayed on a display unit, comprising:
- an external light detection unit which detects an illuminance and a tint of an ambient light; and
- an image quality control unit which adjusts the quality of the video image to be displayed on the display unit;
- wherein the image quality control unit adjusts a color temperature of the video image to be displayed in accordance with an illuminance value and a tint value detected by the external light detection unit; and
- wherein the detected illuminance value and the tint value, and a power saving state resulting from the video image quality adjustment are displayed on an OSD of the display unit.

* * * * *